United States Patent [19]

Lucas

[11] 3,970,538
[45] July 20, 1976

[54] APPARATUS FOR ELECTRO-CHEMICAL MILLING OF TURBINE BLADE EDGES

[75] Inventor: Joseph G. Lucas, Trumbull, Conn.

[73] Assignee: Avco Corporation, Stratford, Conn.

[22] Filed: Mar. 19, 1975

[21] Appl. No.: 559,749

[52] U.S. Cl. .................. 204/224 M; 204/129.35; 204/129.6
[51] Int. Cl.² .................. C25F 3/02; C25F 3/14; C25F 7/00
[58] Field of Search ....... 204/129.35, 129.5, 129.55, 204/129.6, 129.1, 129.7, 224 M

[56] References Cited
UNITED STATES PATENTS

| | | | |
|---|---|---|---|
| 3,268,434 | 8/1966 | Weingartner | 204/129.55 |
| 3,309,294 | 3/1967 | Goodwin | 204/129.35 |
| 3,326,785 | 6/1967 | Williams | 204/129.7 |
| 3,849,273 | 11/1974 | Johnson | 204/129.6 |

*Primary Examiner*—T. M. Tufariello
*Attorney, Agent, or Firm*—Charles M. Hogan; Irwin P. Garfinkle

[57] ABSTRACT

Apparatus is described which enables close tolerance electro-chemical milling of the leading and trailing edges of blades used in gas turbine engines. Using turbine blades formed with the edges slightly oversize in the as-cast condition, electro-chemical milling is used to properly shape the leading and trailing edges. The apparatus comprises an insulated body having a slot shaped to accept the turbine blade. The two outer edges of the slot are fitted with lengthwise slotted metallic tubing which receives the edges of a blade and which forms a channel for a supply of electrolyte for milling the blade edges. Means are provided for accurately positioning the blade within the body.

3 Claims, 9 Drawing Figures

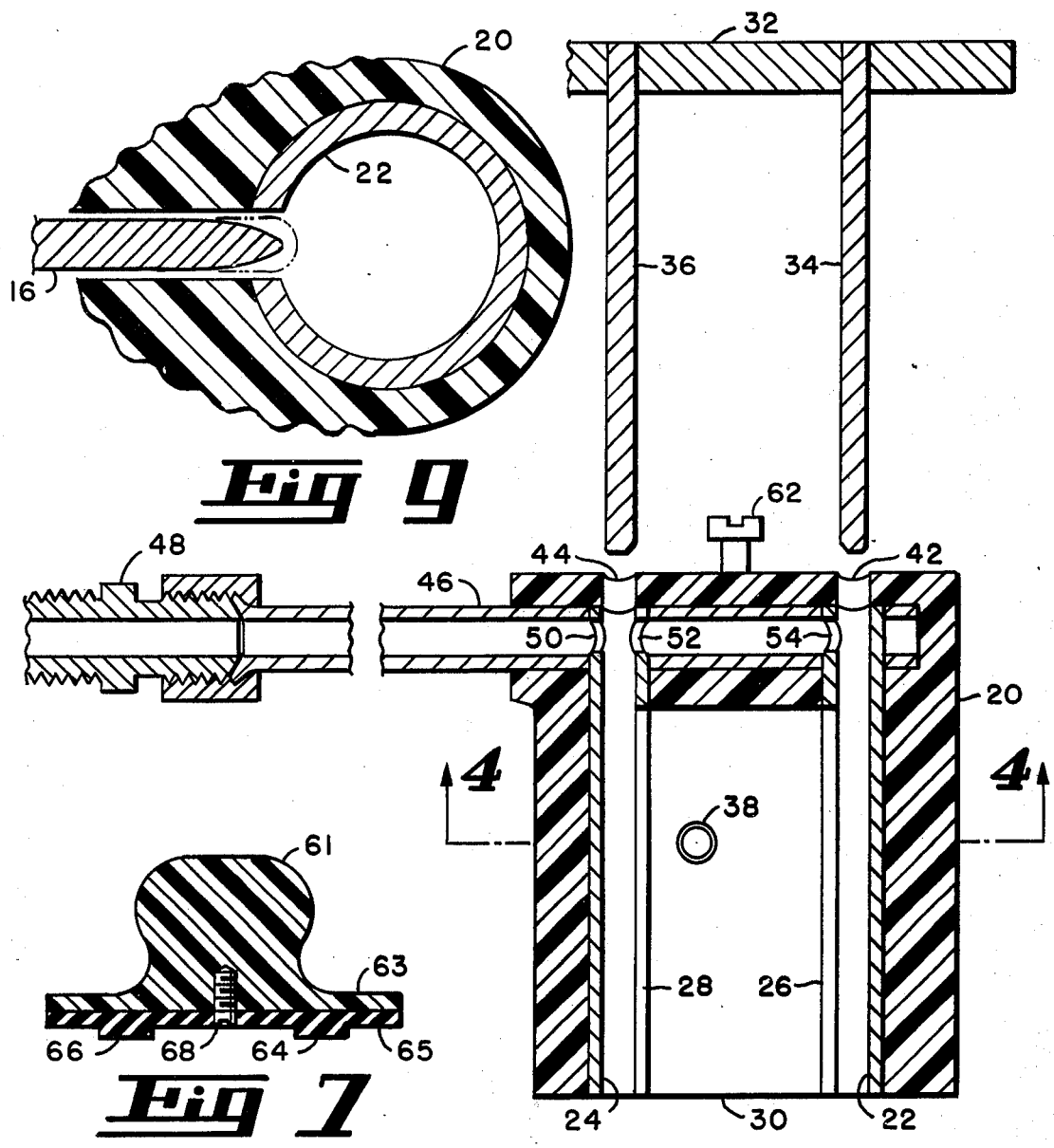
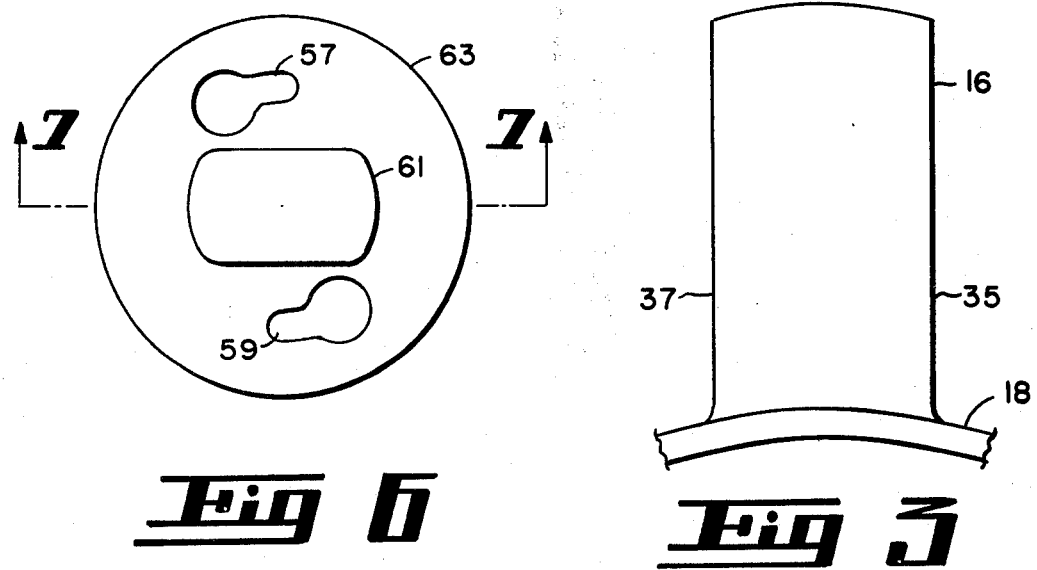

APPARATUS FOR ELECTRO-CHEMICAL MILLING OF TURBINE BLADE EDGES

BACKGROUND OF THE INVENTION

This invention relates to improved means for shaping the leading and trailing edges of integrally cast blades used in aircraft gas turbine engines. In making a compressor rotor, for example, it is aerodynamically important that the blade edges have a small radius of curvature in order to achieve efficient operation. By small is meant that the radius on the leading and trailing edge of a compressor blade be in the range of 0.007 to 0.012 inch. In practice it has been difficult to maintain this sort of dimensional tolerance in the casting process. As a result, it has been common practice to cast the blade edges slightly oversize and then machine to specifications by a milling or grinding process. Since adjacent blades are often less than a half inch apart, it becomes a problem to design cutting tools which are capable of trimming one blade without bumping into adjacent blades. Additionally, the blades themselves may have compound contours which would complicate the tooling problem.

In this environment it has been found advantageous to utilize electro-chemical milling. Using my invention an entire blade can be shaped quickly to close tolerances. Test results show that with my apparatus it is possible to shape a blade in less than a minute. This includes loading and clamping the fixture, milling the blade to size, unclamping the fixture and indexing to the next position.

SUMMARY OF THE INVENTION

This invention comprises apparatus which enables integrally cast blades of gas turbine engines to be electro-chemically milled along their leading and trailing edges. The apparatus includes a fixture having an electrically insulated body with a slot therein which is sized to accept a complete turbine blade. The outer edges of the slot have slit metallic tubes into which the edges of the blades extend. Means are provided for accurately positioning the blade within the slits in the metallic tubing. Electrolyte is passed through the tubes and a voltage supply, together with a current regulator, are connected such that the blade becomes the anode of an electrolytic cell and the two slit tubes form the cathodes. As the electrolytic action proceeds, material is electro-chemically removed from both edges of the blade. Parameter control of such things as the rate of flow of the electrolyte, the current magnitude and the time the process is allowed to continue, may all be varied to optimize the milling operation.

BRIEF DESCRIPTION OF THE DRAWINGS

FIG. 3 is a cross-sectional view of the apparatus used in electro-chemical milling of the blade edges;

FIG. 6 is a top view of the end cap which prevents leakage of electrolyte from the top of the fixture during the milling operation;

FIG. 7 is a cross-sectional side view of the end cap shown in FIG. 6;

FIG. 9 is a fragmentary sectional view of a blade in place in the fixture, showing how the edge is etched away during the milling operation.

DESCRIPTION OF PREFERRED EMBODIMENT

Figure 2:
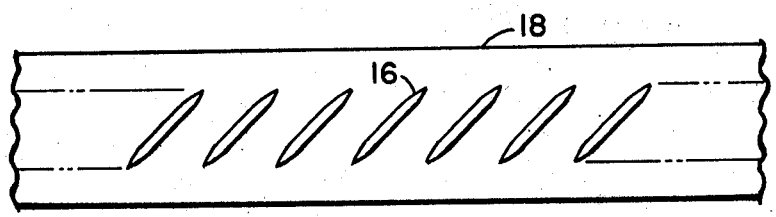
FIG. 2 is a top view of the blade assembly showing the axial pitch of the blades with respect to the turbine wheel.
Figure 1:
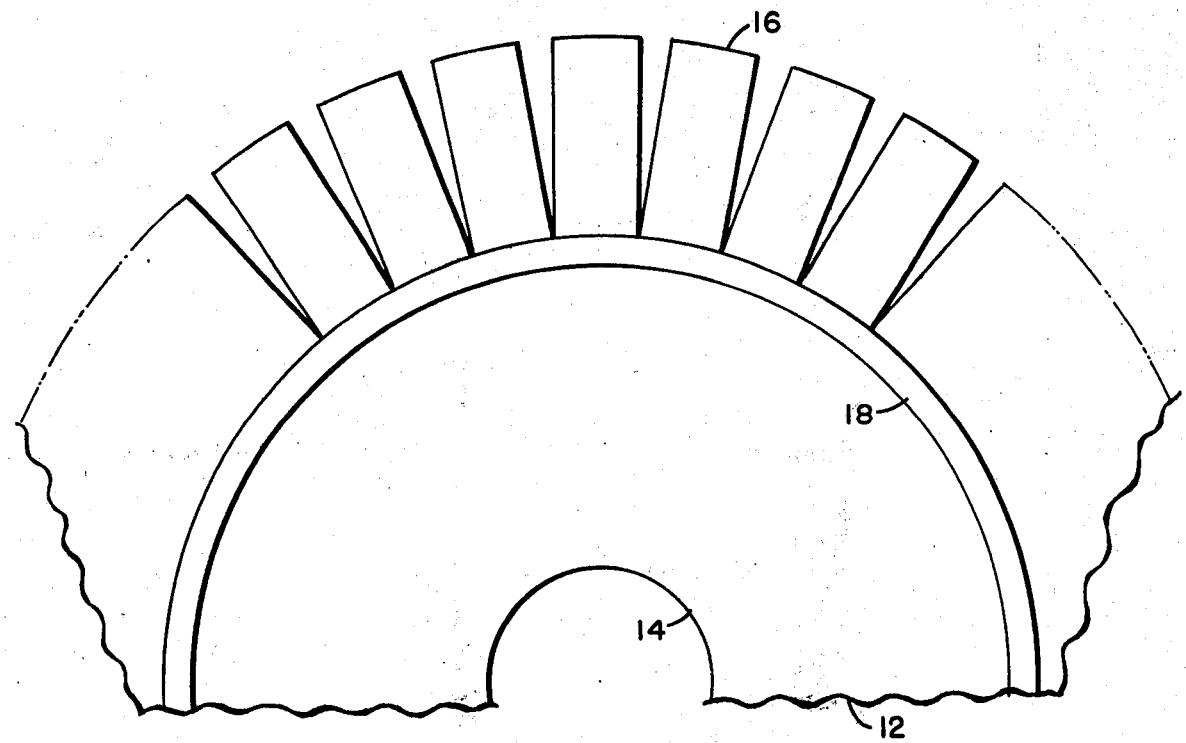
FIG. 1 is a side view of a turbine wheel showing the blades which are integrally cast with the wheel flange.

In FIG. 1 there is shown a partial side view of a turbine wheel 12 having hub 14 which may be keyed to a central driving shaft, not shown. At the periphery of the wheel are a multiplicity of blades 16 which are integrally cast with wheel flange 18. FIG. 2 shows an end view of the arrangement of blades 16 with respect to wheel flange 18. For the case where the blades were part of a compressor stage, motion of the FIG. 2 assembly from left to right would draw air through from top to bottom. To get sufficient operation of the compressor stage it would be important that the leading edges of the blades penetrate the airstream cleanly without buildup of a shock front. To do this requires that each blade edge have a small radius of curvature. The downstream edge of each blade should likewise have a small radius of curvature so as to minimize trailing wake vortices.

Figure 4:
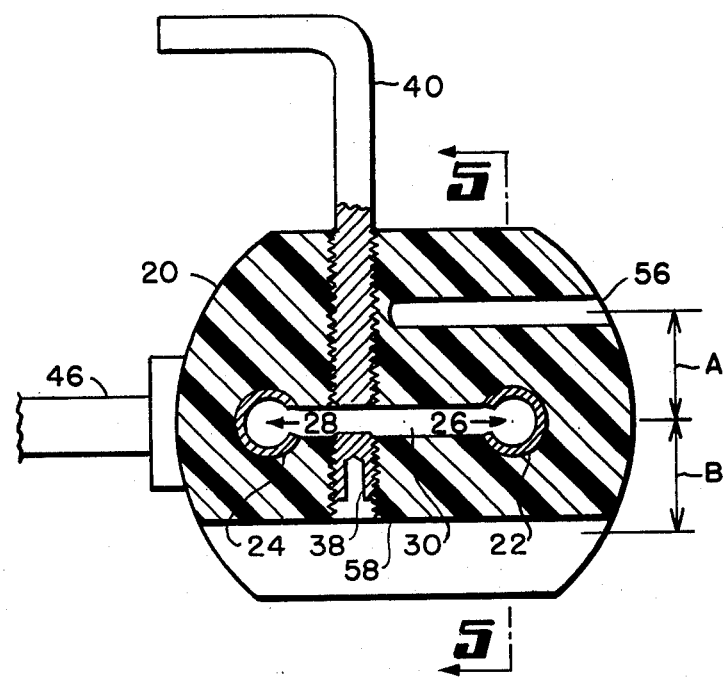
FIG. 4 is a cross-sectional view of the fixture which by use of an apertured slot fits over the blade; the figure shows the clamp which fixedly holds the blade during the milling operation.

FIG. 3 shows a cross-sectional view of apparatus for milling the blade edges to the desired shape. The apparatus may be described as follows: There is a tool casing having a body 20 made from a material which is an electrical insulator (for example, an impact resistant plastic). As best seen in FIG. 4, body 20 has a slot 30 formed therein and sized to accommodate the insertion of turbine blade 16. Along the lengthwise edges of slot 30 there are metallic tubes 22 and 24 provided with slits 26 and 28 communicating with the slot 30. The slits 26 and 28 have a width which matches the thickness of slot 30.

Thus, when the tool casing is slipped over blade 16, blade edges 35 and 37 are immediately adjacent tube slits 26 and 28, respectively. To assure that blade 16 is properly positioned in slot 30, indexing tool 32 is inserted into the tool casing. Indexing tines 34 and 36 slip through holes 42 and 44 in body 20 and penetrate the length of metallic tubes 22 and 24. When the indexing tool is completely inserted so that the tines 34 and 36 are respectively adjacent edges 35 and 37 of blade 16, the blade will have been laterally positioned in slot 30 for electro-chemical milling. Adjustable anvil 38 then serves as a post against which blade 16 can be clamped so that it does not slip out of position after indexing tool 32 is removed. Subsequent to withdrawal of indexing tool 32, holes 42 and 44 are plugged in a manner to be explained later, and electrolyte made to flow down tubes 22 and 24. The electrolyte enters pipe fitting 48 from a source, not shown. The electrolyte travels down tube 46 under pressure, passes through openings 50, 52 and 54, and then flows down tubes 22 and 24, exiting out the bottom of slot 30. With blade 16 in position in the slot the electrolyte wets blade edges 35 and 37 by means of slits 26 and 28 in tubing 22 and 24, respectively.

Referring now to FIG. 4 there is shown a cross-sectional view of the tool casing taken along line 4—4 of FIG. 3. In FIG. 4 there is shown an end-on view of slot 30. The continuity between the surfaces of slot 30 and the inward facing slits in tubes 22 and 24 are also shown. Attention is called to anvil 38 and clamping screw 40. Both are made of titanium alloy and are adjustable in a threaded hole made through the body of the tool casing. Anvil 38 may typically be adjusted by an Allen wrench and will be set so as to correctly center blade 16 in the slot when clamping screw 40 is snubbed up tight against the opposite face of the blade.

When positioning the tool casing onto a blade 16 body 20 is oriented so that adjacent blades fit into open-sided slot 56 and at the same time the oppositely adjacent blade clears surface 58 of body 20. For this reason it is necessary to have dimensions A and B of FIG. 4 match the circular pitch of the turbine blade assembly.

Figure 5:
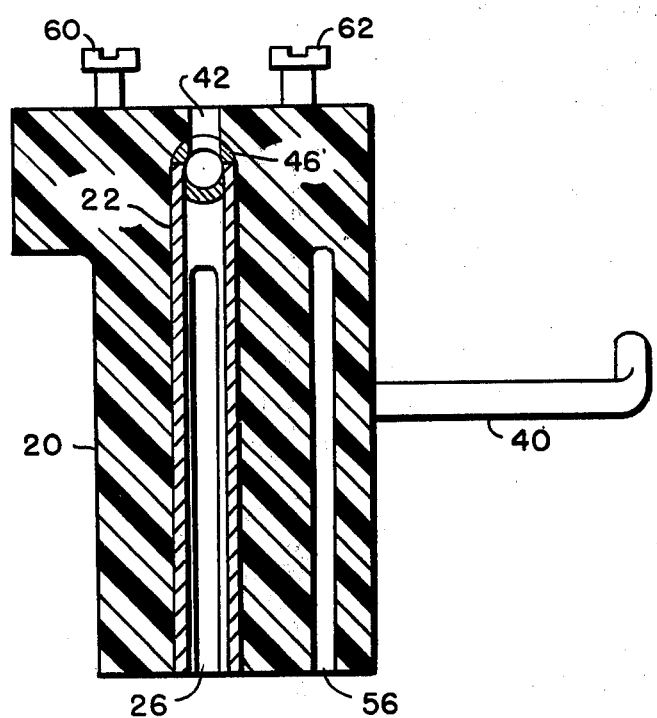
FIG. 5 is another cross-sectional view of the fixture taken at right angles to that of FIG. 4.

FIG. 5 is a cross-sectional view of the tool casing made along line 5—5 of FIG. 4. It provides an edge view of slit 26 which was cut in the inward facing wall of tube 22. Screws 60 and 62 provide one means for using an easily removable cap to cover hole 42 to prevent loss of electrolyte during the milling operation. The cap is shown in FIGS. 6 and 7.

In FIG. 6 there is shown a top view of the cap. The cap consists of a body 63 having holes 57 and 59 therethrough. Holes 57 and 59 are shaped such that at one end they are large enough to accept the heads of screws 60 and 62 while at the opposite ends the size is reduced so as to retain the cap in place under the screw heads. Finger grip 61 makes it easy to push and twist cap 63 into place.

FIG. 7 shows a cross-sectional view of the cap taken along line 7—7 of FIG. 6. Here it will be noted that cap 63 has a compressible gasket 65 on its bottom side which covers holes 42 and 44 by means of raised lands 64 and 66. The compressible gasket, which might be made of Neoprene, is fastened to the body of the cap by means of screw 68.

Figure 8:
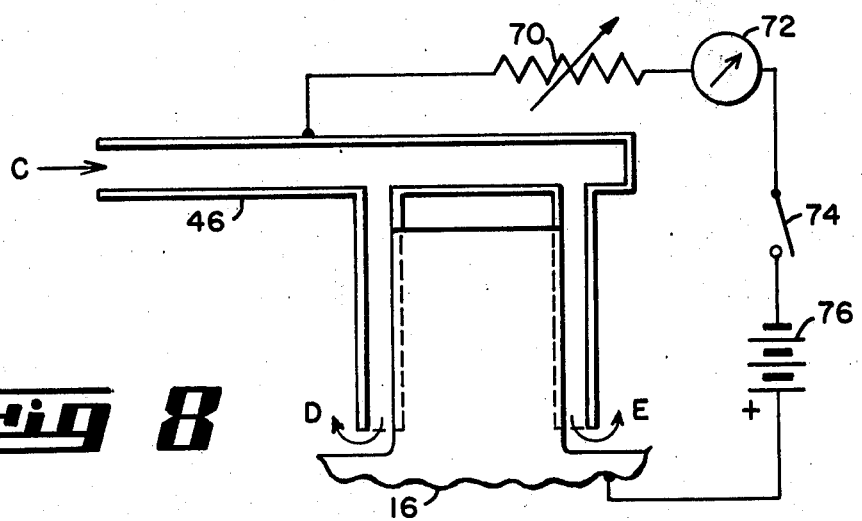
FIG. 8 is a functional diagram partly in schematic form which shows how the voltage supply is connected to obtain electro-chemical milling.

FIG. 8 shows how the electro-chemical action proceeds. Electrolyte is made to flow into tube 46 under pressure. Arrow C shows the direction of flow. The electrolyte will then exit the apparatus at D and E. With electrolyte flowing, an electric circuit is then established by means of variable resistor 70, current meter 72, switch 74 and battery 76. These components are connected so the positive side of the battery is attached to the blade 16 being milled and the negative side of the circuit is attached to metal tube 46.

With the electrolyte flowing, switch 74 is closed and rheostat 70 is adjusted to obtain the desired chemical milling rate. In the unit reduced to practice it was found that the edges of blade 16 could be completely milled to the desired shape for a current of 75 amps and a time duration of 15 seconds.

FIG. 9 shows how the electro-chemical milling action progresses. FIG. 9 represents a partial cross-sectional view of a blade 16 in place in the slot of tool body 20. The electro-chemical milling action between tube 22 and the edge of blade 16 is depicted. Prior to being milled, blade 16 is slightly oversize at the edge with a rather large radius of curvature. This is shown in FIG. 9 as the phantom silhouette edge of blade 16. As the electro-chemical milling progresses the edge of blade 16 gradually assumes the shape shown as a solid line in FIG. 9. It will be noted that the blade edge is much sharper and the radius of curvature at the tip is reduced.

While the blades depicted in FIGS. 1 and 2 are shown as being straight and of constant width, it will be readily perceived that the electro-chemical milling process will work equally well on blades having curved shapes. The guiding criteria is that the slot in the body of the tool casing must match the shape of the blade being milled. For curved blades, the tubes shown as 22 and 24 in FIG. 3 may also be required to be other than coplanar. The same is true as regards the shape of slits 26 and 28 (see FIG. 3).

Additionally, it may be desirable to mill the edges of several blades at once. This can be done by mounting several of the FIG. 3 tools on a mechanically or hydraulically sequenced fixture. For example, tool heads spaced each 60° apart around the periphery of a circle would allow simultaneous milling of six blades at once. For such an assembly the turbine wheel whose blade edges are to be milled could be clamped at the hub on an indexing wheel. Actuation of a "start" button would then cause all six of the tool heads to advance into position and the milling sequence would commence. When finished the tool heads would retract, the blade assembly would then advance to a new position and the milling sequence would be repeated.

It will be understood that other combinations of the electro-chemical milling apparatus which I have invented can be assembled without departing from the spirit of my invention.

I claim:

1. Apparatus for electro-chemical milling of the edges of integrally cast blades used in turbine engines, comprising:

an electrically insulated tool casing body having a slot formed in one end thereof, said slot sized to allow insertion of one of said blades therein;

two hollow electrically-conductive metallic tubes positioned within said tool casing body along each lengthwise edge of said slot, each of said tubes having a slit through its inward facing side wall to provide communication between the center of said tubes and said slot;

indexing means for centering said blade within the slits in the metallic tubing at said slot edges;

means for accurately positioning each of said integrally cast blades in said tool casing body, said means comprising the forming of spaced apart reference slots and surfaces in the tool casing body, the shape of said slots and said surfaces being complementary to the contour of adjacent blade elements of said integrally cast blade assembly whereby close dimensional and blade-to-blade pitch tolerance can be maintained during electro-chemical milling;

clamping means for holding said blade in its indexed position within said tool casing body;

means for supplying a flow of electrolyte to each of said tubes; and voltage supply means for establishing a current flow between each of said metallic tubes and said blade.

2. The invention as defined in claim 1 wherein said indexing means comprises a pair of spaced tines insertable in said tool casing body and sized so as to be able to penetrate the length of and along the center axis of said metallic tubes.

3. The invention as defined in claim 1 wherein said clamping means comprises an adjustable anvil and set screw combination positioned in a threaded passageway through said tool casing body so as to make contact with opposite sides of said blade when said blade is positioned in said slot.

* * * * *